(12) United States Patent
Krent et al.

(10) Patent No.: US 8,381,642 B2
(45) Date of Patent: Feb. 26, 2013

(54) CONTAINER WITH SUSPENDED RACK

(75) Inventors: Adam Krent, Brooklyn, NY (US);
William J. Lazaroff, Floral Park, NY (US)

(73) Assignee: Lifetime Brands, Inc., Garden City, NY (US)

( * ) Notice: Subject to any disclaimer, the term of this patent is extended or adjusted under 35 U.S.C. 154(b) by 420 days.

(21) Appl. No.: 12/728,027

(22) Filed: Mar. 19, 2010

(65) Prior Publication Data

US 2010/0236424 A1    Sep. 23, 2010

Related U.S. Application Data

(60) Provisional application No. 61/161,638, filed on Mar. 19, 2009.

(51) Int. Cl.
*A47J 36/00* (2006.01)

(52) U.S. Cl. .............. 99/450; 99/393; 99/449; 99/418

(58) Field of Classification Search ........... 99/450, 99/449, 393, 400, 416, 418
See application file for complete search history.

(56) References Cited

U.S. PATENT DOCUMENTS

| | | | | |
|---|---|---|---|---|
| 2,360,026 A * | 10/1944 | Wall | | 99/426 |
| 3,075,798 A * | 1/1963 | Smith | | 294/15 |
| 3,084,617 A * | 4/1963 | Jamentz | | 99/426 |
| 4,718,402 A * | 1/1988 | Fordyce | | 126/337 R |
| 5,775,209 A * | 7/1998 | Tiemann | | 99/426 |
| 6,164,194 A * | 12/2000 | Westmoreland | | 99/426 |
| 6,457,594 B1 * | 10/2002 | Tiemann | | 211/181.1 |
| 6,546,850 B1 * | 4/2003 | Akiyama-Warren | | 99/427 |
| 6,595,120 B1 * | 7/2003 | Tiemann | | 99/426 |
| 7,350,458 B2 * | 4/2008 | Leibowitz | | 99/340 |
| 7,766,184 B2 * | 8/2010 | Avery et al. | | 220/573.1 |
| 2010/0136194 A1* | 6/2010 | Schutte | | 426/510 |
| 2010/0236424 A1* | 9/2010 | Krent et al. | | 99/450 |

* cited by examiner

*Primary Examiner* — Raleigh W. Chiu

(74) *Attorney, Agent, or Firm* — Ryan A. Schneider, Esq.; Troutman Sanders LLP

(57) ABSTRACT

A system for providing a cooking rack, with or without a complementary container. The rack can comprise lateral elements and longitudinal elements arranged to form a grid. The rack can comprise a gate that can be affixed in a first position and moved from the first position to a second position. In the second position, items can easily be removed from the rack without lifting the items. The rack can further comprise one or more handles to facilitate movement of the rack by the user. The system can comprise a rack and a complementary pan. The pan can comprise a radiused bottom to enable the rack to sit in the pan above the bottom of the pan. The pan can further comprise one or more handles to facilitate movement of the pan by the user.

21 Claims, 9 Drawing Sheets

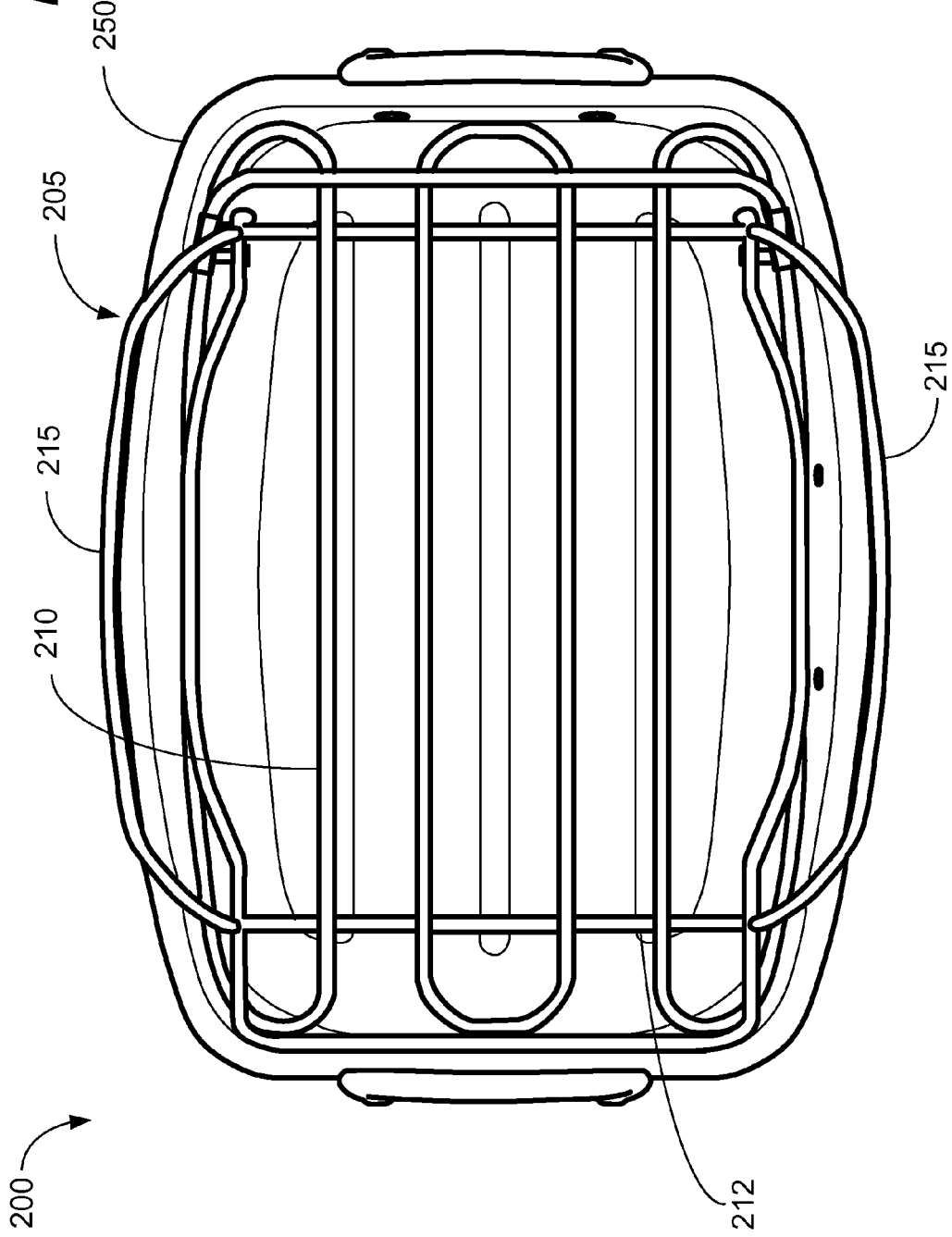

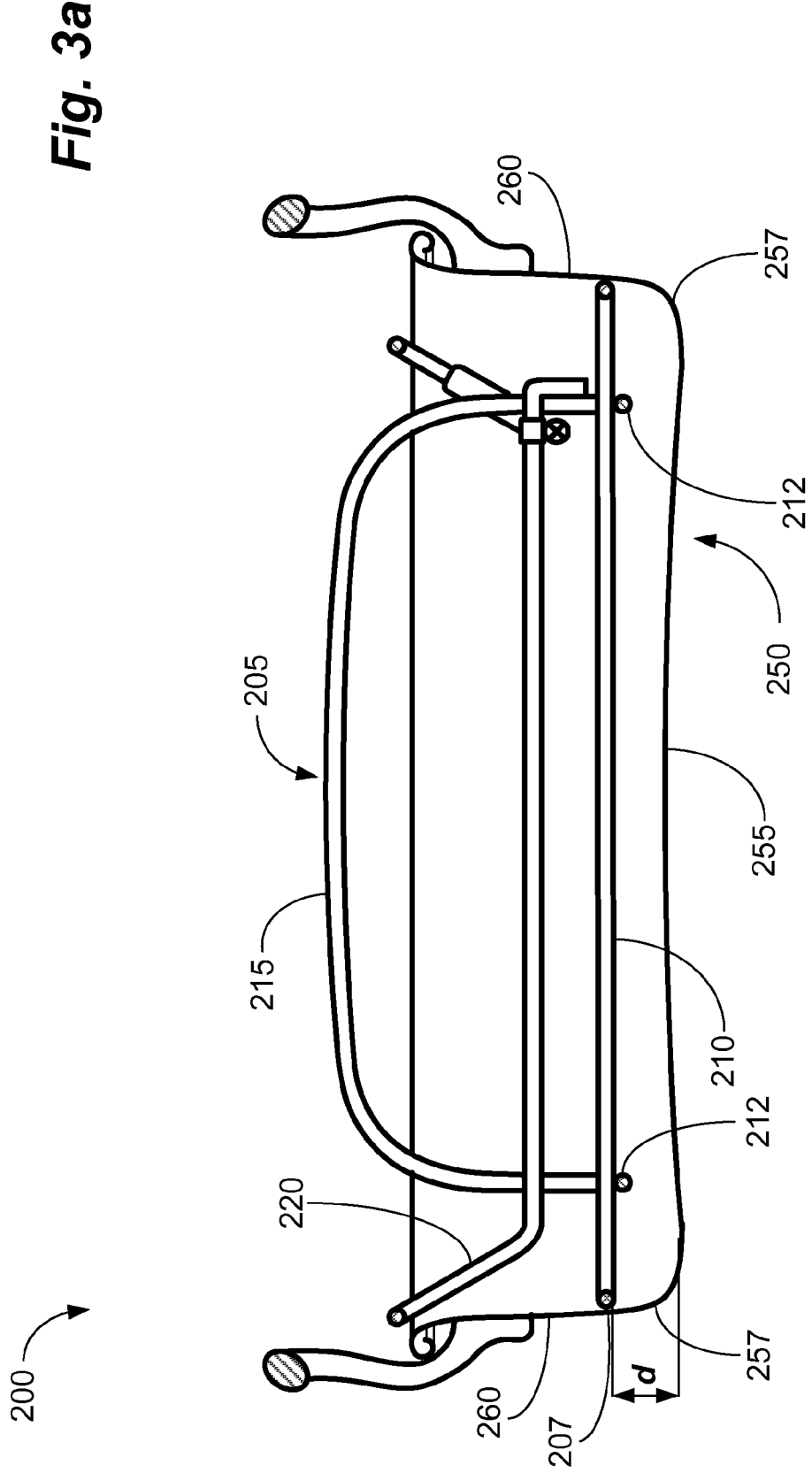

CONTAINER WITH SUSPENDED RACK

CROSS-REFERENCE TO RELATED APPLICATIONS

This application claims the benefit, under 35 U.S.C. §119 (e), of U.S. Provisional Application Ser. No. 61/161,638, filed 19 Mar. 2009, the entire contents and substance of which is hereby incorporated by reference.

BACKGROUND OF THE INVENTION

1. Field of the Invention

The present invention relates generally to a container with a suspended rack, and in particular, to a container with a suspended rack comprising a gate on one or more sides to ease removal of objects placed thereon.

2. Description of the Related Art

Various types of pans and pots with racks exist and are used for a multitude of purposes. For example, household ovens generally have racks built into them. These racks are used to suspend cookware placed in the oven and to enable heat to circulate evenly around the cookware. The racks often slide in and out on tracks provided in the oven to aid in inserting and removing objects to and from the oven. The racks are generally coated, plated, or painted wire to provide even heat distribution and minimize sticking and staining.

Racks may also be used for essentially the opposite purpose, i.e., for cooling items. Racks are often used, for example, to cool baked items. This enables the item to cool more evenly from all sides and can prevent, for example, cracks from forming in cakes or cookies as they cool. Cooling racks can also be used for items that are more easily removed from the cookware when hot than when cold. Cooling racks can also protect heat sensitive surfaces from hot pots and pans, for example, immediately after they come out of the oven or off the stove.

As shown in FIG. 1, racks 105 can also be used to enable objects to be cooked in a pan 110 in a suspended fashion to prevent them from sitting in cooking juices while cooking. Racks 105 are often used, for example, in roasting pans 110, which are conventionally used for cooking large items such as turkeys and roasts ("roasts"). The rack 105 can be suspended above the bottom 115 of the pan 110 on feet 120 to enable the juices produced during cooking to be captured in the bottom of the pan 110 without the roast sitting in the juices. This can prevent the roast from becoming greasy and can make roasted food healthier by, among other things, reducing the fat and cholesterol content of the cooked product. The rack 105 can sit on its feet 120, for example, or can rest on tabs, or other means, provided in the pot 110 (not shown).

Conventionally, racks 105 used in combination with roasting pans 110 have had several drawbacks. One drawback is that racks 105 often do not fit well in the roasting pan 110 in which they are used. This can create a problem whereby the user attempts to lift or move the roasting pan 110, e.g., to take the pan out of the oven, and the rack 105 slides within the pan 110. Given that many roasts weigh more than 20 pounds, this can dramatically change the center of gravity of the pan 110, twisting or tilting the pan, and can lead to several problems.

For example, the twisting of the pan 110 can cause the user to be splashed with hot fluids from the pan 110, for example, causing severe burns. In some scenarios, the pan 110 can twist out of the user's hands completely. This can result in both burn and drop injuries to the user, property damage, not to mention loss of the roast. Given the high cost food and the risk of injury, this can cause significant economic and physical damages.

Another problem associated with conventional racks 105 is that they generally lack handles. In other words, the rack 105 is a flat rack that is placed in the bottom 115 of the roasting pan 110. This configuration can present a second significant problem: removing the roast from the roasting pan 110. With a flat rack 105, the rack 105 is sitting in the bottom 115 of the pan and is often completely obscured by the sides 125 of the pan 110 and the roast. As a result, the user is forced to remove the roast from the pan 110 and the rack 105 simultaneously using tongs or serving forks, for example. The user must then place the roast on the intended surface. This means that the user must lift the heavy, extremely hot roast out of the pan 110, and place it, for example, on a separate serving platter or cutting board.

Alternatively, the user may attempt to lift the roast out of the pan 110 on the rack 105 by lifting the rack 105 itself. This can be very difficult to do, however, given the depth of a typical roasting pan 110 and the temperature at which the pan 110 typically comes out of the oven. Attempting to reach into the pan 110 to grasp the rack 105 without touching the sides 125 of the pan 110 can be difficult if not impossible. On the other hand, wearing an oven mitt or other protective clothing can make it impossible for the user to fit their hand between the roast and the pan 110. In either case, removing the roast from the pan 110 is at best awkward and at worst dangerous.

In addition, the rack 105 may comprise, for example, a plurality of welded wires used to form a grid. This can make the rack 105 very difficult to grasp with conventional kitchen utensils. In addition, picking up the rack 105 with the roast thereon may exceed the load carrying capacity of the rack 105 causing it to bend or break. This can also cause the user to be injured as they drop, or attempt to prevent dropping, the roast.

Finally, because the flat rack 105 is designed to sit on the bottom 115 of the pan 110 on feet 120, the height d may be insufficient. In other words, because the rack 105 sits on the bottom 115 of the pan 110 on small feet 120, the roast may wind up sitting in its own juices. This can make the bottom of the roast soggy and unappetizing and can increase the fat and cholesterol content of the roast. The flat rack 105, therefore, can defeat the health advantages of roasting meats in the first place.

What is needed is a rack and a pan that have a complementary shape such that the rack does not slide inside the pan, wherein the rack has handles and holds the roast securely, but provides a convenient means of removal of the roast from the rack without lifting. It is to such a device that embodiments of the present invention are primarily directed.

BRIEF SUMMARY OF THE INVENTION

Briefly described, embodiments of the present invention relate to a rack useful in many applications. The rack can comprise a supporting grid comprising one or more lateral members and one or more longitudinal members. The spacing of the members can be varied depending on the intended application. The rack can further comprise an upright on one end to contain objects placed in the rack.

In some embodiments, the rack can further comprise a gate pivotally coupled to the supporting grid. The gate can have a first, closed position and a second, open position. In the closed position, the gate can contain objects placed on the rack. In the open position, the gate can be rotated down even with, or below, the surface of the supporting grid to enable objects placed on the rack to be removed. The gate can allow objects to be removed from the rack simply by sliding the objects out of the side of the rack. This can preclude the need to lift heavy objects, such as a roast, to remove them from the rack.

In some embodiments, the rack can further comprise a fastening element for holding the gate in the closed position. The rack can further comprise one or more handles with which to lift the rack. In some embodiments, the handles can extend above the rack to enable the handles to be grasped safely without touching the rack. The rack can further comprise feet to hold the rack above a surface. The feet can be adjustable to vary the height the rack sits above the surface.

Embodiments of the present invention also relate to a system comprising the aforementioned rack and a complementary pan. In some embodiments, the pan can have curved sides such that the cross-section of the pan tapers near the bottom. The rack can be sized such that it has substantially the same planform as the tapered portion of the pan. In some embodiments, this can prevent movement of the rack within the pan. In other embodiments, this can hold the rack off the bottom of the pan to hold objects placed thereon above the bottom of the pan. In still other embodiments, the rack can have adjustable feet to vary the height from the bottom of the pan to the rack.

In some embodiments, the pan can further comprise one or more handles. In some embodiments, the handles can be extended to provide extra room between the pan handles and the pan. This can enable the pan handles to be grasped safely without touching the potentially hot pan. Similarly, in some embodiments, the rack handles can also be extended to provide extra room between the rack handles and the pan, when the rack is installed in the pan. This can enable the rack handles to be grasped safely without touching the potentially hot pan.

Embodiments of the present invention can further comprise a lid for the pan. The lid can comprise a curved section on a first end and a second end to clear the upright and the gate on the rack. In some embodiments, the lid can further comprise one or more cut-outs to clear the rack handles. In this configuration, the lid can substantially seal the pan despite the protruding upright, gate, and rack handles.

In still other embodiments, the rack may be used separately in many applications in which cooking items on a rack can be advantageous. These and other objects, features and advantages of the present invention will become more apparent upon reading the following specification in conjunction with the accompanying drawing figures.

BRIEF DESCRIPTION OF THE FIGURES

FIG. 2a illustrates a top view of a system for providing a container with a suspended rack, in accordance with some embodiments of the present invention.

FIG. 3a illustrates a cutaway view of a system for providing a container with a suspended rack, in accordance with some embodiments of the present invention.

DETAILED DESCRIPTION OF PREFERRED EMBODIMENTS

Figure 1:
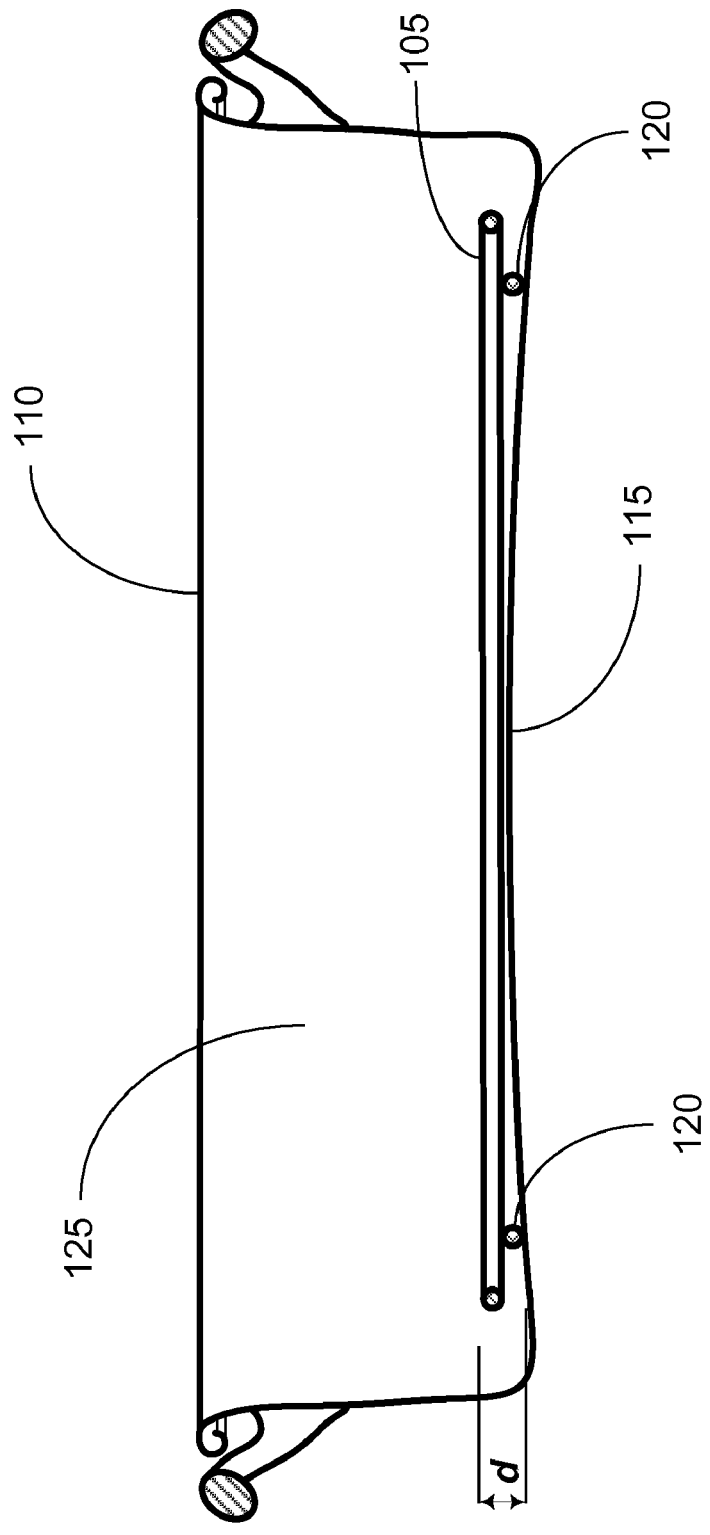
FIG. 1 illustrates a cross-sectional view of a conventional flat rack inside a conventional roasting pan.

To facilitate an understanding of the principles and features of embodiments of the invention, they are explained hereinafter with reference to implementations in illustrative embodiments. Embodiments of the invention are described in the context of being a system comprising a floating rack in a container and in particular, to a floating rack in a roasting pan. The rack can further comprise one or more folding gates to facilitate removal of items placed thereon for use in many cooking applications.

The materials described hereinafter as making up the various elements of the present invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention, for example. The dimensions listed in the various drawings are for illustrative purposes only and are not intended to be limiting. Other dimensions and proportions are contemplated and intended to be included within the scope of the invention.

To facilitate an understanding of the principles and features of embodiments of the invention, they are explained hereinafter with reference to a system or a rack for containing a "roast." The term "roast" is used merely to simplify explanation of embodiments of the present invention and is not intended to be literal or limiting. Embodiments of the present invention are equally suited to contain many objects for which a rack or a rack and a matching container can be desirable.

Referring now in detail to the drawings, wherein like reference numerals represent like parts throughout the several views, as shown in FIG. 2a, embodiments of the present invention can comprise a system 200 comprising a floating rack 205 for use with a corresponding roasting pan 250. The system 200 can be used for cooking items for which a rack 205, or a rack 205 fitted in a pan 250, can be advantageous. The rack 205 can also be used separately in many applications where a rack 205 with folding sides can be beneficial. In other words, embodiments of the present invention are not intended to be limited for use with a roasting pan 250, but indeed anytime a rack 205 or a container with a floating rack 205 is indicated.

In some embodiments, the system 200 can include a rack 205 comprising one or more longitudinal elements 210 and/or one or more lateral elements 212. These elements 210, 212 can form a grid for supporting an object placed thereon. In an exemplary embodiment, shown in FIG. 2a, the longitudinal elements 210 can be elongated ovals and the lateral elements 212 can be substantially straight, though other configurations are contemplated. In other embodiments, the number of lateral 212 and longitudinal 210 elements can be varied to suit the type of items to be cooked. In other words, smaller items can require more elements 210, 212 to reduce the size of the grid, while larger items can require fewer large, strong elements 210, 212.

Figure 2B:
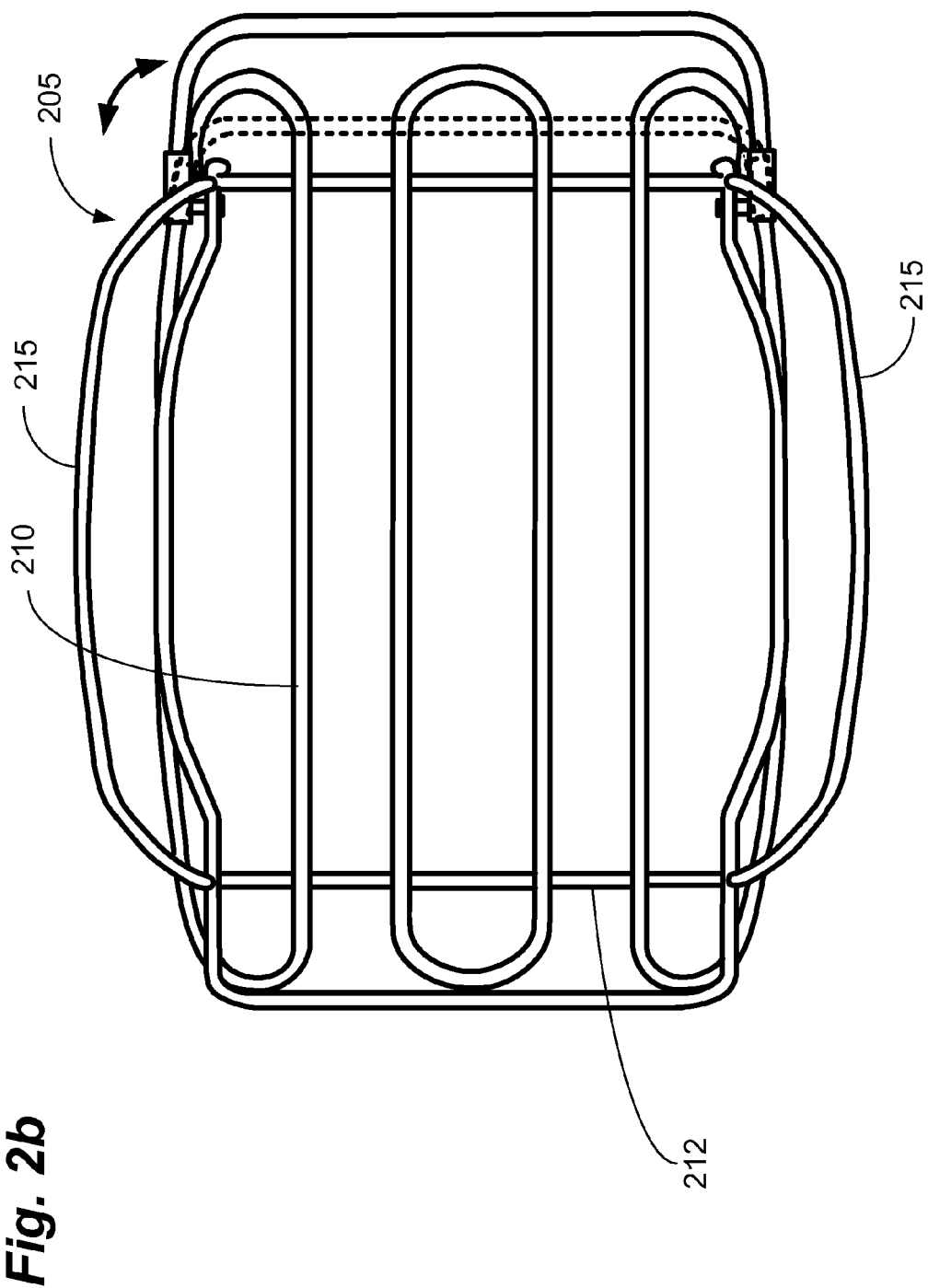
FIG. 2b illustrates a top view of a rack for use with or without the system of FIG. 2a, in accordance with some embodiments of the present invention.

In an exemplary embodiment, the rack 205 can further comprise rack handles 215. In an exemplary embodiment, as shown in FIGS. 2a and 2b, the rack handles 215 can be formed integrally with the lateral elements 212, which can simplify manufacturing, lower cost, and increase strength. In other embodiments, the rack handles 215 can be integral with the longitudinal elements 210. In still other embodiments, the rack handles 215 can be separate elements attached to the rack 205 using, for example and not limitation, welds, solder, rivets, screw, or pins. In some embodiments, the rack handles 215 may further comprise additional longitudinal 210 or lateral 212 elements to enable the rack 205 to contain smaller objects such as, for example, vegetables. The rack handles 215 can enable the rack to be handled and removed more easily, for example when the user is donning oven mitts or other protective clothing.

Figure 3B:
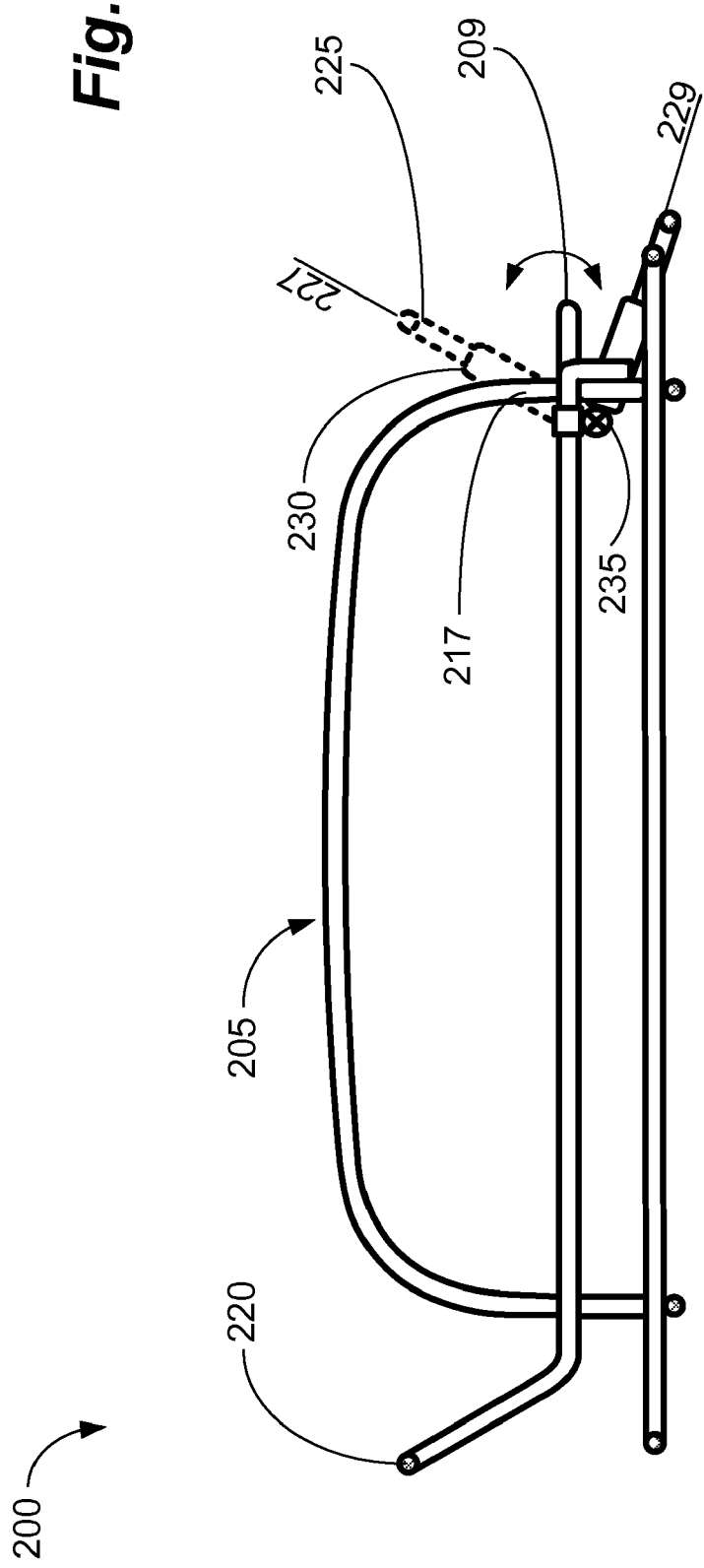
FIG. 3b illustrates a side view of a rack for use with or without the system of FIG. 3a, in accordance with some embodiments of the present invention.
Figure 4A:
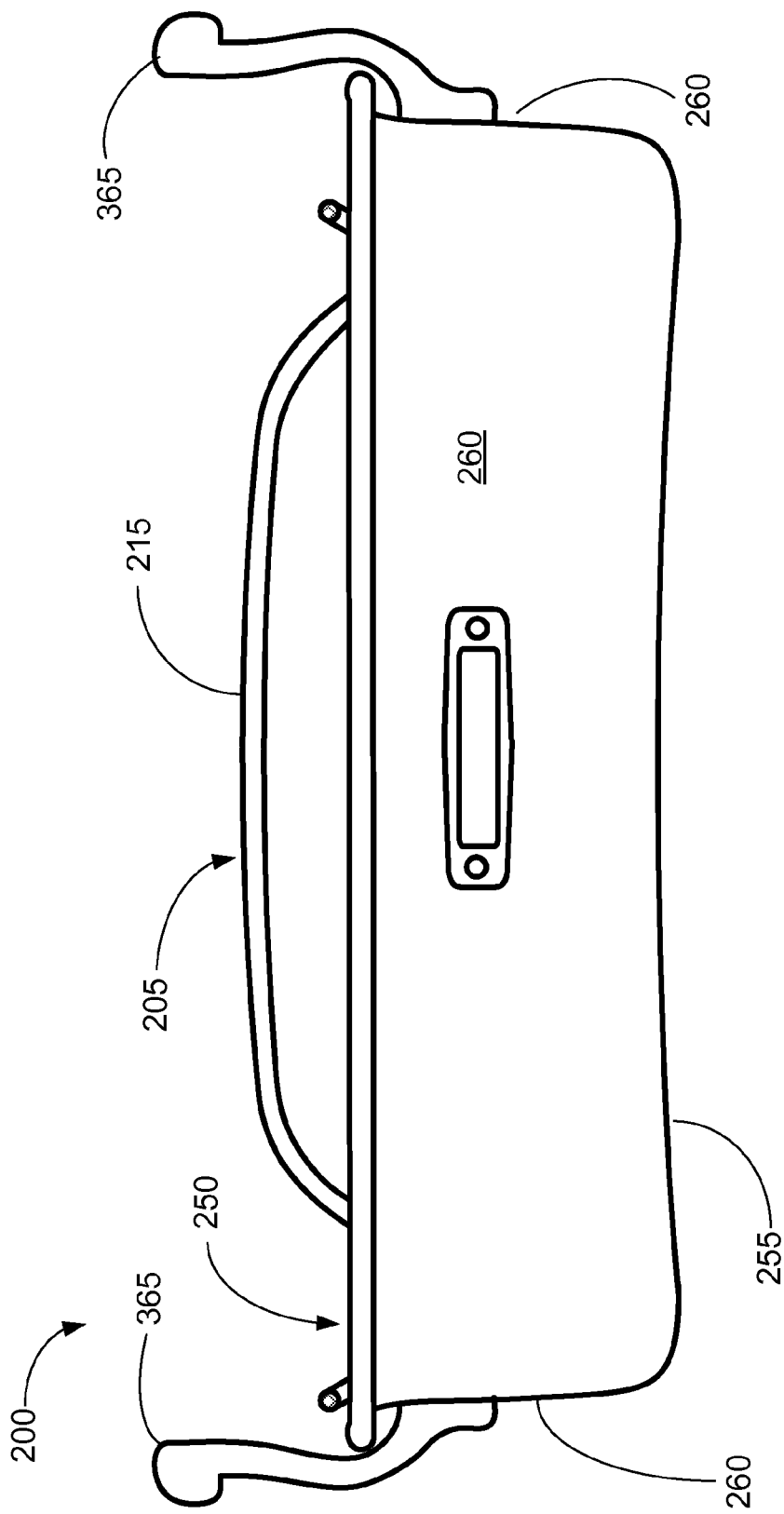
FIG. 4a illustrates a side view of a system for providing a container with a suspended rack, in accordance with some embodiments of the present invention.

In some embodiments, as shown more clearly in FIGS. 3a and 4a, the rack handles 215 can extend above the top of the pan 250. This spacing can provide ample distance between the rack 205 and the pan 250. This can enable the user to remove the rack 205 from the pan 250 while the user's hands remain a safe distance from the pan 250. This can enable the use of, for example and not limitation, hot pads (as opposed to oven mitts) to remove the rack 205 while minimizing the risks of burns on the user's hands from the pan 250.

In some embodiments, shown in FIG. 3a, the rack 205 may further comprise an upright 220 formed on a first end 207 of the rack 205. The upright 220 can form a boundary at the first end 207 of the rack 205 to prevent the roast from falling off the rack 205 when the rack 205 is moved or handled. Like the rack handle 215, the upright 220 may further comprise additional longitudinal 210 or lateral 212 elements to prevent smaller objects from falling through. In some embodiments, the upright 220 can be integrally formed with the longitudinal elements 210 by bending the ends of the longitudinal elements 210 upward. In other embodiments, the upright 220 may be a separate piece or pieces attached to the rack 205 using, for example and not limitation, welds, solder, rivets, screw, or pins.

In other embodiments, the upright 220 can be pivotally attached to the rack 205 to enable the adjustment of the angle between the rack 205 and the upright 220. This can enable the rack 205 to be adjusted for different pans, for example. In some embodiments, the upright 220 can be set at an included angle of between about 90° and 150° from the longitudinal element 210. In a preferred embodiment, the upright 220 can be fixed at an included angle of approximately 120° from the longitudinal element 210, though other configurations are contemplated.

As shown in FIG. 3b, embodiments of the present invention can further comprise a gate 225 affixed to a second end 209 of the rack 205. In some embodiments, the gate 225 can move between a first position 227 and a second position 229. In an exemplary embodiment, the gate 225 may further comprise a pivot 235. In some embodiments, the pivot 235 can hingeably affix the gate 225 to the rack 205 and can enable the gate 225 to rotate between the first position 227 and the second position 229. In the first position 227, for example, the gate 225 can prevent unwanted movement of the roast and can form an element similar to the upright 220.

The gate 225 can be opened and lowered to many positions between the first position 227 and the second position 229 to adapt to the heights of, for example and not limitation, various containers, dishes, or counter tops. In use, the rack 205 can be removed from the pan 250 and placed next to a cutting board, for example. The adjustable nature of the gate 225 can enable it to be opened onto cutting boards of various thicknesses by simply changing the angle of the gate 225. The pivot 235 can be, for example and not limitation, a screw, bolt, pin, or rivet.

In some embodiments, the gate 225 can be lowered to the second position 229 in which the gate 225 is horizontal, or below horizontal. In this position the roast can be removed from the rack 205 by sliding it sideways onto, for example, a serving tray. This eliminates the need to lift the roast, using tongs or other implements, to remove it from the rack 205, thus eliminating the dangers outlined above. Additionally, the gate 225 can pivot to any position between the first position 227 and the second position 229, which can enable the gate 225 to be lowered to many different levels. This can enable the roast to be transferred directly from the rack 205 to, for example and not limitation, the counter, a cutting board, or a serving platter.

In an exemplary embodiment, the gate 225 may further comprise a fastening element 230. In some embodiments, the fastening element 230 may be a notch formed in the gate 225. The notch 230 can be formed such that it can snap over the vertical portion 217 of the rack handle 215. This can enable the gate 225 to be retained in the first position, yet enable the gate 225 to be unsnapped and moved from the first position 227 to the second position 229. In some embodiments, the fastening element 230 can be a silicone sleeve designed to hold the gate 225 in the first position 227. In still other embodiments, the fastening element 230 can be, for example and not limitation, magnets, a hook and eye, a latch, or a snap.

In some embodiments, the rack 205 can be formed from welded wire and be affixed to one another using for example and not limitation, welding, soldering, or adhesive. In other embodiments, the rack 205 can be cast from, for example and not limitation, steel, iron, or aluminum. In still other embodiments, the rack 205 can be molded or extruded from, for example and not limitation, a heat resistant polymer.

Figure 4B:
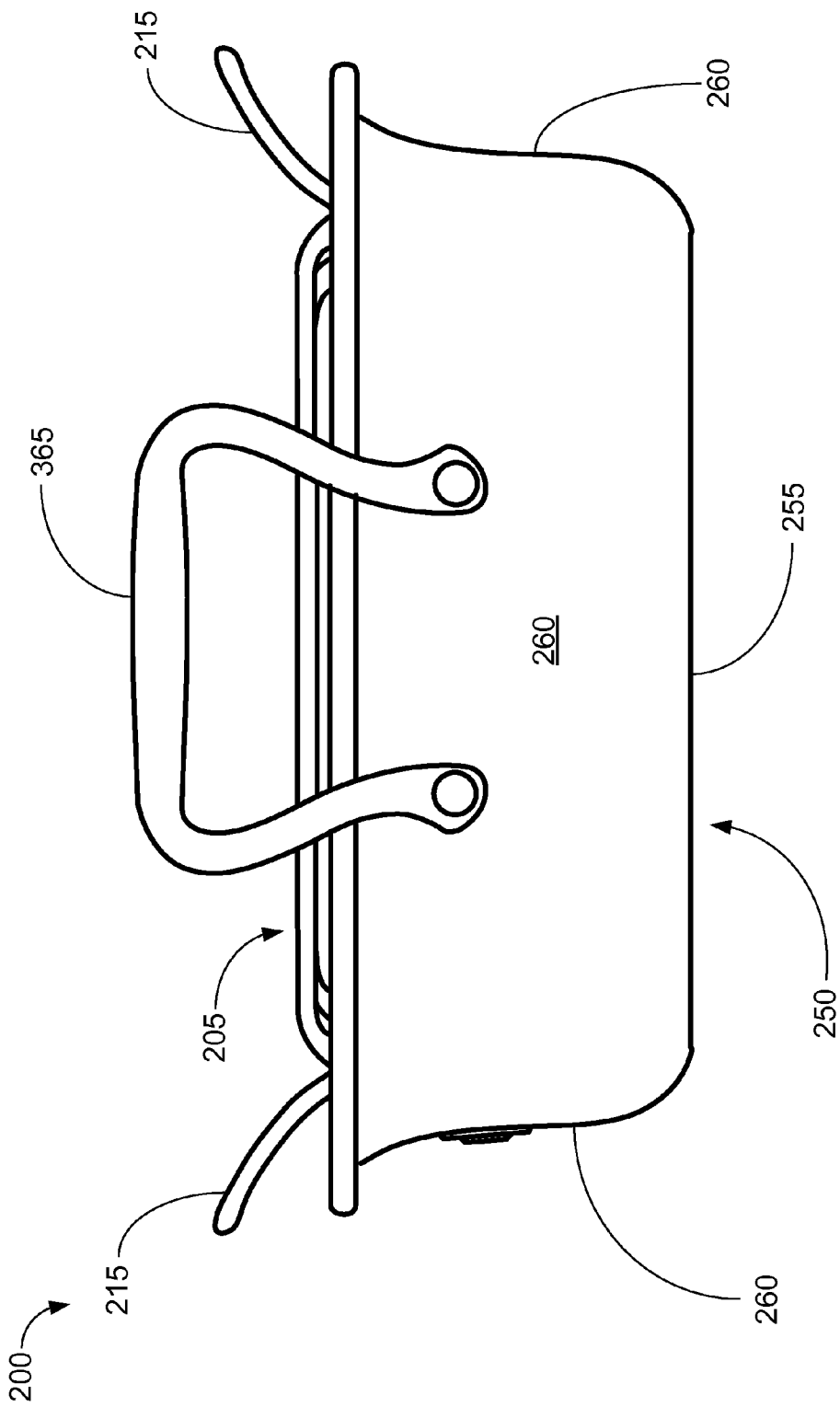
FIG. 4b illustrates an end view of a system for providing a container with a suspended rack, in accordance with some embodiments of the present invention.

As shown in FIGS. 4a and 4b, in some embodiments, the system 200 can further comprise a roasting pan 250. In some embodiments, the roasting pan 250 can comprise a bottom 255 and three or more sidewalls 260. In some embodiments, the pan 250 may be three-sided to enable, for example, convenient turkey roasting. In other embodiments, the pan 250 may preferably be a conventional four-sided roasting pan, though other configurations are contemplated.

In a preferred embodiment, the pan 250 is sized and shaped such that the rack 205 and at least a portion of the pan 250 have substantially similar planforms. In this manner, the rack 205 can fit near the bottom 255 of the pan 250, for example, with minimal clearance. This can prevent the rack 205 from sliding inside the pan 250 when the pan is moved. In a preferred embodiment, the clearance between the sidewalls 260 of the pan 250 and the rack is approximate 0.2 inches (6 mm). This can enable the rack 205 to be inserted in the pan 250 easily while appropriately limiting movement. Limiting the movement of the rack 205 can prevent significant changes to the center of gravity of the pan 250 by, in turn, limiting the movement of the roast the pan 250.

In some embodiments, the pan can further comprise one or more pan handles 365. This can enable the pan 250 to be easily carried and/or moved. In some embodiments, the pan 250 can have one handle to enable the user to carry the pan 250 by using the pan handle 365 and then placing a hot pad, or other implement, under the pan 250. In a preferred embodiment, the pan 250 can comprise two handles to enable the pan 250 to be removed and carried using the pan handles 365 exclusively. In still other embodiments, the pan 250 can comprise four handles 365 to enable the pan to be removed from an oven, for example, regardless of the orientation of the pan 250.

Conventionally, the handles on many roasting pans have been affixed adjacent the sidewall of the pan. See, e.g., FIG. 1. This places the user's hand dangerously close to the hot pan when attempting to move the pan. In some embodiments, therefore, the pan handles 365 can be affixed to, but extend above, the top of the sidewall 260 of the pan 250. See, FIGS. 4a and 4b. This can enable the user to grasp the pan handles 365 of the pan 250 while maintaining a safe distance thereto. This can prevent burns caused by inadvertently touching the pan 250 while attempting to grasp the pan handles 365.

Figure 5A:
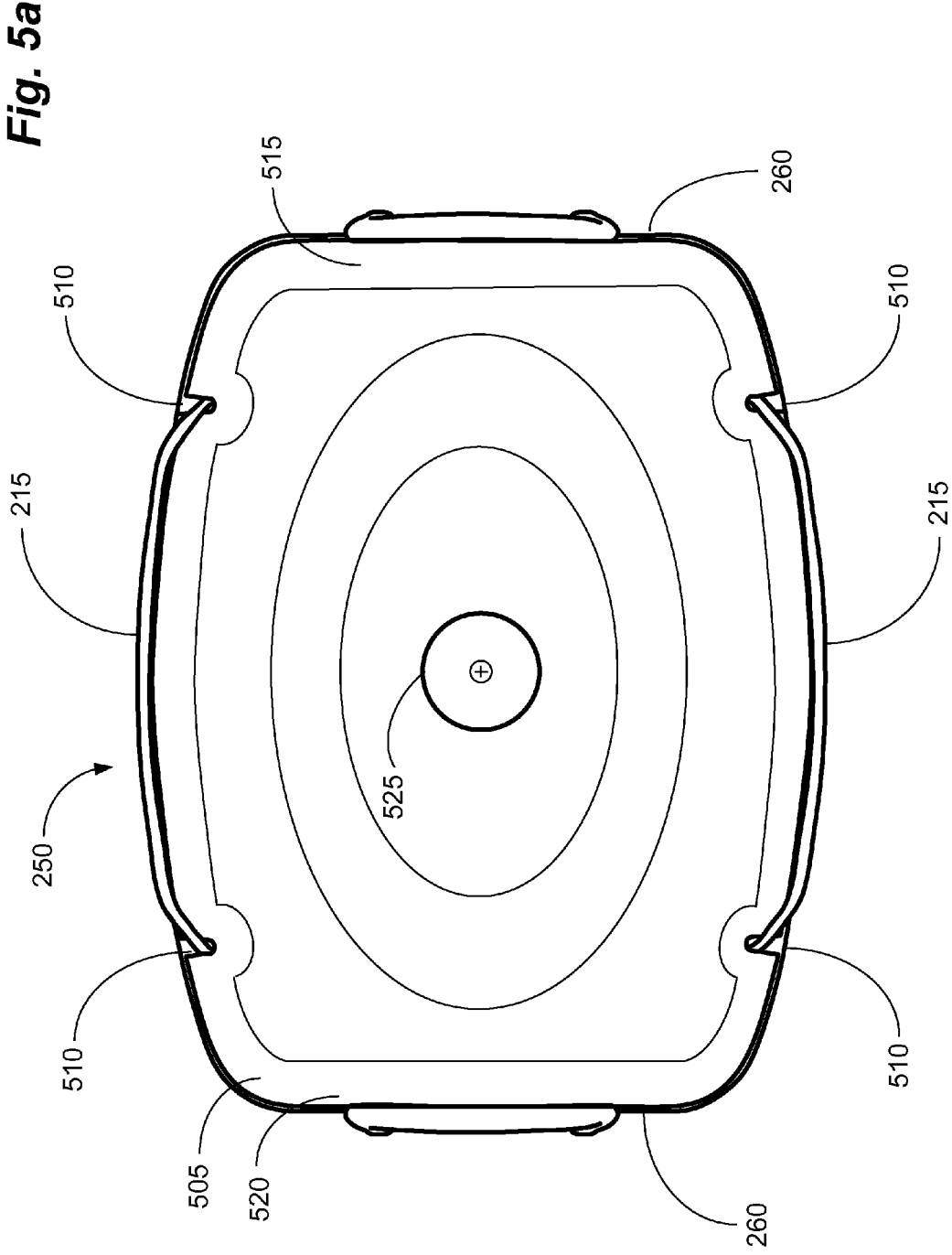
FIG. 5a illustrates a top view of a system for providing a container with a suspended rack and a lid, in accordance with some embodiments of the present invention.
Figure 5B:
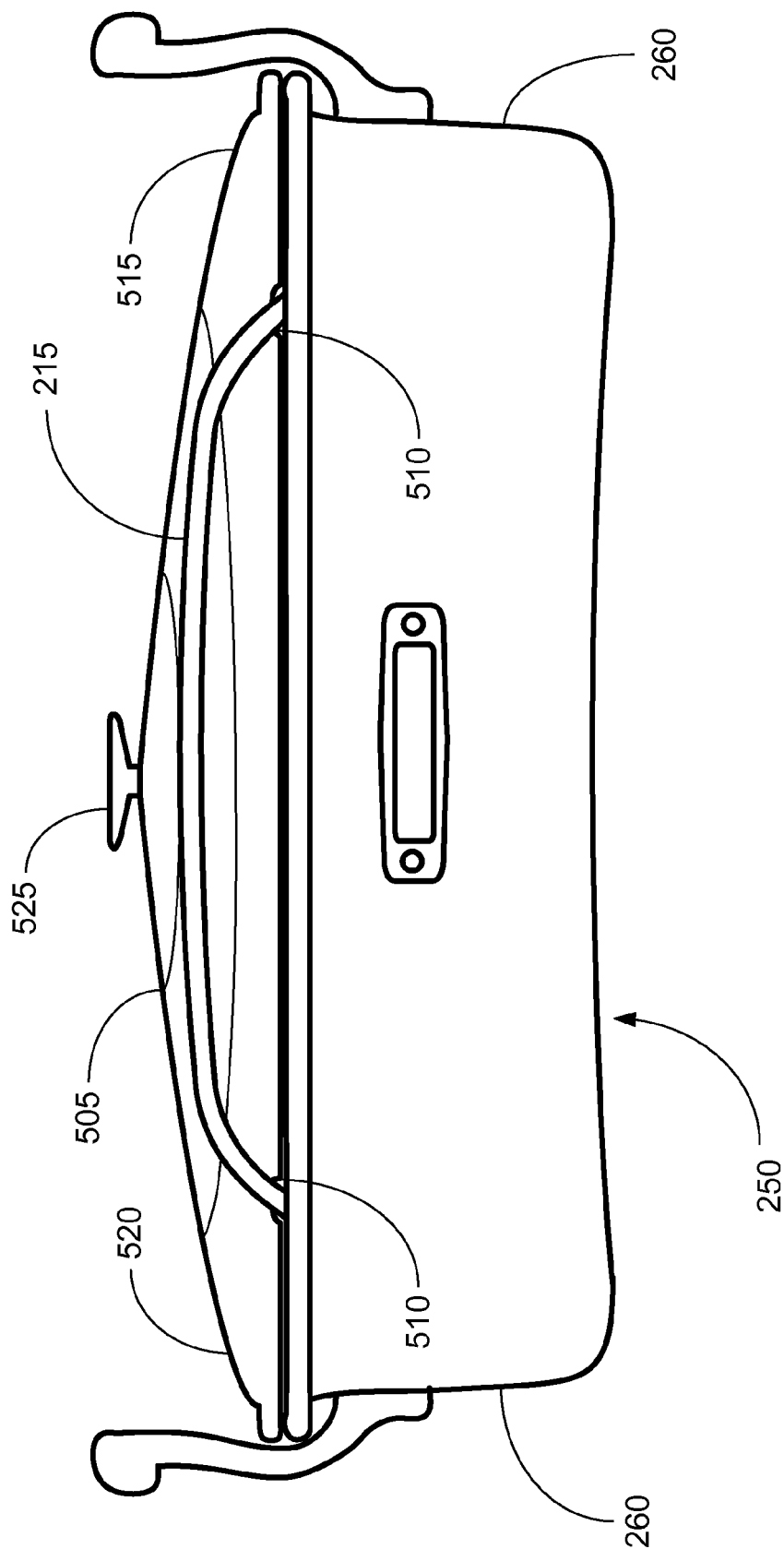
FIG. 5b illustrates a side view of a system for providing a container with a suspended rack and a lid, in accordance with some embodiments of the present invention.

In some embodiments, shown in FIGS. 5a and 5b, the pan 250 can further comprise a lid 505. In some embodiments, the lid 505 can comprise one or more cut-outs 510. The cut-outs 510 can be disposed such that the lid 505 fits over the handle (s) 215 of the rack 205. As shown in FIGS. 5a and 5b, for example, if the rack has two handles 215, the lid 505 can have four cut-outs 510. This configuration can enable the lid 505 to substantially seal the pan 250, while still clearing the rack handles 215.

Similarly, the ends 515, 520 of the lid 505 can be curved upwardly from the sides 260 of the pan 250. This can enable the lid 505 to clear the gate 225 (not shown) on one end 515 and the upright 220 (not shown) on the other end 520. In this manner, the lid 505 can substantially seal the pan 250, while enclosing the gate 225 and the upright 220 inside the pan 250.

In some embodiments, the lid can further comprise a handle, or knob 525. In some embodiments, the knob 525 can comprise a heat resistant material to enable the pan 250 to be used in an oven, for example. In other embodiments, the knob 525 can comprise an insulative material so that the knob 525 remains cool when used on a stove, for example. In other embodiments, a piece of insulative material can be disposed between the knob 525 and the pan 250 for the same purpose.

Referring back to FIG. 3a, in some embodiments, the rack 205 can be suspended above a bottom surface 255 of the pan 250 by the longitudinal elements 210 or the lateral elements 212. In other words, the longitudinal elements 210 can form feet on the lower portion of the grid for the rack 205 and can hold the bottom of the rack 205 above the bottom 255 of the pan 250. Alternatively, the lateral elements 212 can form the lower portion of the grid for the rack 205 (as shown) and can hold the bottom of the rack 205 above the bottom 255 of the pan 250. This can prevent the roast from sitting in its own juices while it cooks. In an alternative embodiment, the rack 205 may further comprise adjustable feet (not shown) or arms to enable the rack 205 to stand above of the bottom 255 of the pan 250. This can enable the height d the rack 205 sits above the pan 250 to be adjustable.

In a preferred embodiment, the pan 250 can have a decreasing cross section from top to bottom. In other words, the junction between the sidewalls 260 and the bottom 255 of the pan 250 can be tapered and/or can form an arc 257. In this configuration, the rack 205 can be lowered into the pan until the cross-sectional area of the pan 250 becomes the same as that of the rack 205. This can enable the rack 205 to sit a distance d above the bottom of the pan 250.

This distance d can be varied based on the radius and shape of the arc 257. In other words, if the arc 257 is configured to have a very small radius, the rack 205 will sit closer to the bottom of the pan 250. On the other hand, if the arc 257 is configured to have a very large radius, the rack 205 will sit farther from the bottom 255 of the pan 250. In some embodiments, the pan 250 can be sold as a kit with multiple racks 205 of various sizes. The size of the rack 205 can be chosen based on the preferred distance of the rack 205 from the bottom of the pan 250 for the job at hand.

The system 200 can be used for roasting items in the conventional manner. The user can place the rack 205 in the pan 250 and place the items to be cooked on the rack 205. The user can then place the lid 505 on the pan 250, if applicable, and place the pan 250 in, or on, the heat source, i.e., in an oven or on a stovetop. When cooking is complete, the user can remove the pan 250 from the heat source using the pan handles 365 and then remove the rack 205 from the pan 250 using the rack handles 215. The user can then open the gate 225 to a desired position between the first position 227 and the second position 229, and conveniently unload the cooked items. The items can be removed from the rack 205 without lifting and can be easily transferred to the desired surface by simply sliding the roast to and off the second end 209 of the rack 205 using the gate 225 as a ramp.

In other embodiments, the rack 205 may be used separately from the pan 250. The rack 205 can be placed, for example and not limitation, on a grill, smoker, or over an open fire. This can enable items that might otherwise fall through the grate on the grill to be grilled safely and also removed from the grill easily. The user can simply place the items to be grilled in the rack 205, close the gate 225, and place the rack 205 on the grill using the rack handles 215. When cooking is complete, the user can remove the rack 205 from the grill using the rack handles 215, open the gate 225, and easily remove the contents. In some embodiments, the rack 205 can comprise additional longitudinal 210 and lateral elements 212 to create a tighter grid to prevent small or delicate items from falling through. A tighter grid can be useful when cooking, for example, vegetables or fish.

In still other embodiments, the system 200 can be used to steam items. To steam items, the rack 205 can be placed inside the pan 250. Due to its design, the rack 205 can be suspended above the bottom 255 of the pan 250 enabling the user to place water in the bottom 255 of the pan 250. In a preferred embodiment, the depth of the water should not exceed the distance d from the bottom 255 of the pan to the rack 205. The user can then place the items to be steamed on the rack 205 with the gate 225 closed. The user can then place the pan 250 on a source of direct or indirect heat and steam the contents of the rack 205. When steaming is complete, the user can remove the rack 205 from the pan 250, open the gate 225, and easily remove the contents.

In still other embodiments, the system 200 or the rack 205 can be used for deep fat frying. In one embodiment, the pan 250 can be partially filled with oil and heated. In this configuration, the rack 205 can be used much like the basket of a deep fat fryer. In other words, the user can place the items to be fried in the rack 205 and then lower the rack 205 into the hot oil. When the items are fully cooked, the rack 205 can be removed from the oil and placed on, for example, paper towels. The gate 225 can be lowered to enable the contents to be easily removed. In an alternative embodiment, the rack 205 can be used in conjunction with a dedicated deep fat fryer, instead of the proprietary basket, while adding the functionality of the handles 215 and the gate 225, among other things.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, materials, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A rack for use in cooking food items comprising:
a plurality of longitudinal elements;
a plurality of lateral elements, disposed proximate, and at an angle, to the plurality of longitudinal elements, such that the plurality of longitudinal elements and the plurality of lateral elements form a supporting grid for supporting food items;
an upright, disposed on a first end of the rack and affixed to one or more of the plurality of longitudinal elements and the plurality of lateral elements, for substantially enclosing the first end of the rack; and
a gate, pivotally coupled to the second end of the rack, with a first, closed position and a second, open position;
wherein the upright is provided by bending one or more of the longitudinal elements upwardly;
wherein, in the closed position, the gate substantially encloses the second end of the rack; and
wherein, in the open position, the gate enables food items to be slideably removed from the second end of the rack.

2. The rack of claim 1, wherein the upright is disposed at an included angle of between approximately 90 and 150 degrees from the supporting grid.

3. The rack of claim 1, wherein the upright is disposed at an included angle of approximately 120 degrees from the supporting grid.

4. The rack of claim 1, wherein the plurality of longitudinal elements and the plurality of lateral elements are perpendicular to one another.

5. The rack of claim 1, wherein, in the open position, the gate is even with or below the supporting grid to enable food items to be removed from the rack without lifting the food items.

6. The rack of claim 1, wherein in the closed position, the gate is disposed at an included angle of between 90 and 150 degrees from the supporting grid.

7. The rack of claim 1, further comprising one or more handles affixed to the supporting grid for lifting the rack.

8. The rack of claim 1, further comprising a fastening element for holding the gate in the closed position.

9. The rack of claim 1 further comprising:
one or more handles affixed to the supporting grid for lifting the rack; and
a fastening element for holding the gate in the closed position; and
wherein the upright is disposed at an included angle of between approximately 90 and 150 degrees from the supporting grid;
wherein the plurality of longitudinal elements and the plurality of lateral elements are perpendicular to one another;
wherein, in the open position, the gate is even with or below the supporting grid to enable food items to be removed from the rack without lifting the food items; and
wherein in the closed position, the gate is disposed at an included angle of between 90 and 150 degrees from the supporting grid.

10. A system for containing food items comprising:
a rack comprising:
a plurality of longitudinal elements;
a plurality of lateral elements, disposed proximate to, and at an angle to, the plurality of longitudinal elements, such that the plurality of longitudinal elements and the plurality of lateral elements form a supporting grid for supporting food items;
an upright, disposed on a first end of the rack and affixed to one or more of the plurality of longitudinal elements and the plurality of lateral elements, for substantially enclosing the first end of the rack;
a gate, pivotally coupled to the second end of the rack, with a first, closed position and a second, open position; and
one or one or more rack handles coupled to the supporting grid; and
a pan comprising:
inwardly curving sides, such that a lower portion of the pan has a smaller cross-section than an upper portion of the pan; and
a lid for substantially sealing the top of the pan and comprising one or more cut-outs to enable the rack handles to protrude through the lid when the lid is placed on the pan;
wherein the rack has substantially the same planform as the lower portion of the pan to prevent lateral movement, longitudinal movement, or both of the rack within the pan;
wherein, in the closed position, the gate substantially encloses the second end of the rack;
wherein, in the open position, food items can be slideably removed from the second end of the rack; and
wherein the rack handles are disposed a second distance above the top of the pan to enable the rack to be lifted without touching the pan.

11. The system of claim 10, wherein the rack handles and one or more of the longitudinal elements and the lateral elements are integrally formed.

12. The system of claim 10, the pan further comprising one or more pan handles coupled to one or more sides of the pan;
wherein the pan handles are disposed a first distance above the top of the pan to enable the pan to be lifted by the handles without touching the pan.

13. The system of claim 12, wherein the first and second distances are each between approximately one and six inches.

14. The system of claim 10, wherein the lower portion of the pan that has the same planform as the rack is disposed approximately one-quarter of an inch to two inches above a bottom, inside surface of the pan.

15. The system of claim 10, the rack further comprising:
adjustable feet, pivotally coupled to the support grid, for supporting the rack on the inside surface of the pan approximately one-quarter of an inch to two inches above a bottom, inside surface of the pan.

16. A system for containing food items comprising:
a pan comprising inwardly curving sides, such that a lower portion of the pan has a smaller cross-section than an upper portion of the pan; and
a rack comprising:
a plurality of longitudinal elements;
a plurality of lateral elements, disposed proximate to, and at an angle to, the plurality of longitudinal elements, such that the plurality of longitudinal elements and the plurality of lateral elements form a supporting grid for supporting food items;
an upright, disposed on a first end of the rack and affixed to one or more of the plurality of longitudinal elements and the plurality of lateral elements, for substantially enclosing the first end of the rack; and
a gate, pivotally coupled to the second end of the rack, with a first, closed position and a second, open position;

wherein the rack has substantially the same planform as the lower portion of the pan to prevent lateral movement, longitudinal movement, or both of the rack within the pan;

wherein, in the closed position, the gate substantially encloses the second end of the rack;

wherein, in the open position, food items can be slideably removed from the second end of the rack; and wherein the upright is provided by bending one or more of the longitudinal elements upwardly.

17. The system of claim 16, the pan further comprising one or more pan handles coupled to one or more sides of the pan;

wherein the pan handles are disposed a first distance above the top of the pan to enable the pan to be lifted by the handles without touching the pan.

18. The system of claim 17, wherein the first and second distances are each between approximately one and six inches.

19. The system of claim 16, the rack further comprising one or one or more rack handles coupled to the supporting grid;

wherein the rack handles are disposed a second distance above the top of the pan to enable the rack to be lifted without touching the pan.

20. The system of claim 16, wherein the lower portion of the pan that has the same planform as the rack is disposed approximately one-quarter of an inch to two inches above a bottom, inside surface of the pan.

21. The system of claim 16, the rack further comprising:

adjustable feet, pivotally coupled to the support grid, for supporting the rack on the inside surface of the pan approximately one-quarter of an inch to two inches above a bottom, inside surface of the pan.

\* \* \* \* \*